May 23, 1961 H. M. FOX 2,985,104
IMPROVED CARTRIDGE FOR PRODUCING GAS
Filed Jan. 3, 1955 2 Sheets-Sheet 1
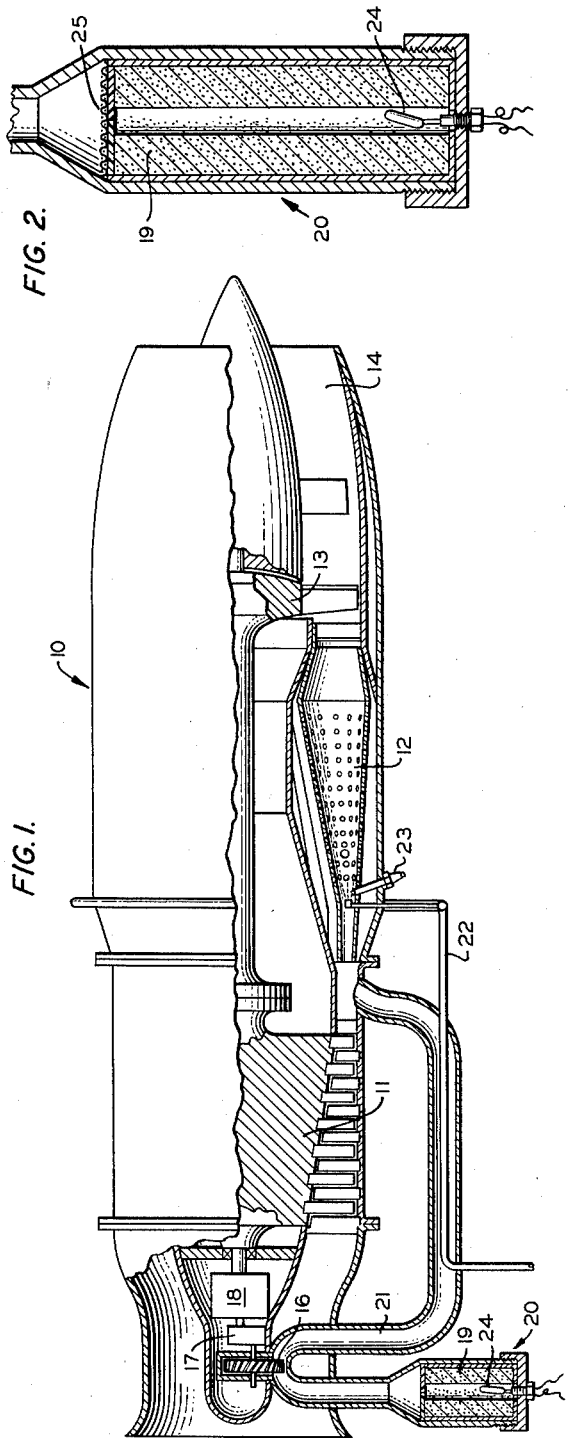
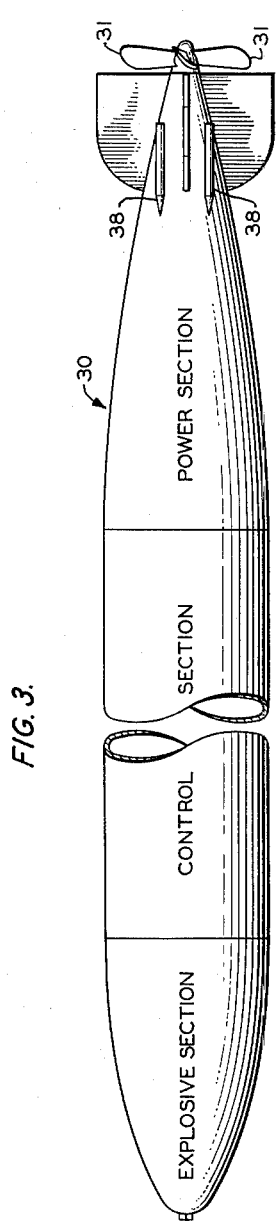
INVENTOR.
H. M. FOX
BY Hudson and Young
ATTORNEYS May 23, 1961 H. M. FOX 2,985,104
IMPROVED CARTRIDGE FOR PRODUCING GAS
Filed Jan. 3, 1955 2 Sheets-Sheet 2
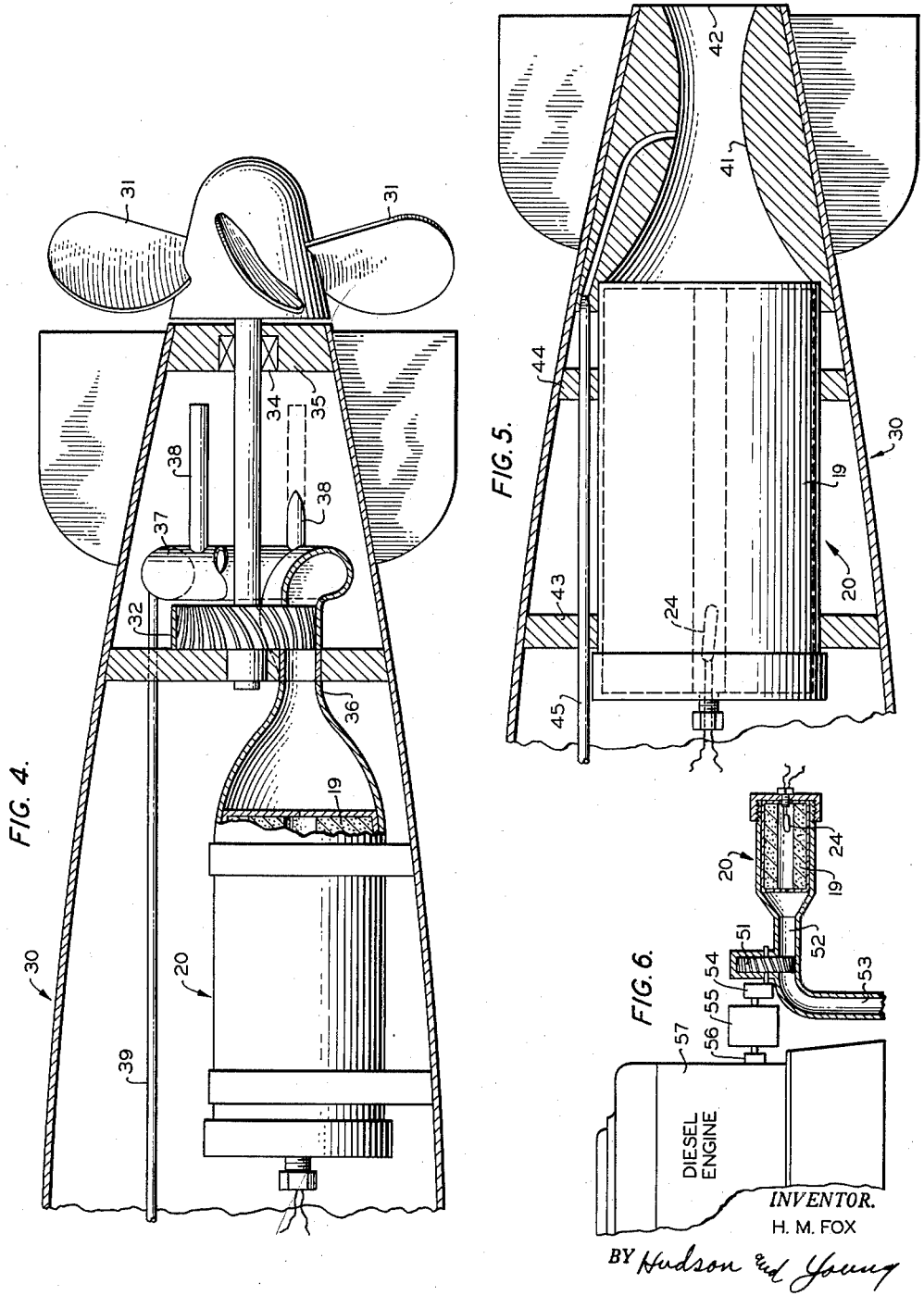
INVENTOR.
H. M. FOX
BY Hudson and Young
ATTORNEYS

United States Patent Office 2,985,104
Patented May 23, 1961

2,985,104

IMPROVED CARTRIDGE FOR PRODUCING GAS

Homer M. Fox, Bartlesville, Okla., assignor to Phillips Petroleum Company, a corporation of Delaware Filed Jan. 3, 1955, Ser. No. 479,321

6 Claims. (Cl. 102—39)

This invention relates to gas generators. In one of its more specific aspects this invention relates to an improved gas generating cartridge adapted for use as a source of heat and power. In another of its more specific aspects this invention relates to an improved gas generator for use in starting turbine engines. In still another of its more specific aspects it relates to an improved gas generator as a source of power for propelling vehicles.

Engines used in aircraft propulsion require starting systems which are usually too bulky and heavy to be carried by the aircraft and therefore such aircraft engines are usually started by means of a portable starting means maintained on the ground. The starting of turbine propelled aircraft is more difficult than the starting of reciprocating engine propelled aircraft because the power requirements of a turbine driven engine are considerably greater than those of reciprocating engines. These turbine engines normally comprise a compressor wherein air is drawn and compressed, a combustion system in which fuel is mixed with part of the air delivered by the compressor and the mixture burned, a turbine driven by the hot gases resulting from the combustion plus cooling air, and a tail cone or exhaust nozzle through which these gases are exhausted thus providing thrust for the aircraft. Auxiliary starting means are required, in such engines, for rotating the compressor prior to the injection of fuel so that there will be a mass flow of air through the engine sufficient to sustain combustion upon ignition of the fuel and air mixture.

A variety of aircraft borne starting means have been proposed for the purpose of starting aircraft gas turbine engines, some operating electrically, and others being powered by small reciprocating pistion engines. Such starting systems, however, are heavy and bulky. Utilization of turbine starters driven by the products of combustion of a solid propellant is a very promising method for starting gas turbine engines, and particularly in applications wherein aircraft must be equipped with self-contained starting systems because solid propellants produce a great quantity of power while at the same time are light and compact. Various solid propellants have been proposed as gas turbine engine starters, however, all of these propellants have possessed certain undesirable characteristics and limitations which renders them unsatisfactory for this application. For example, a solid propellant containing about 60 percent nitrocellulose, 20 percent nitroglycerine and various additives designed to control burning rate and bind the other ingredients together, generates combustion products at an extremely high temperature, usually around 3000° F. Modification of this propellant, by reducing the amount of nitroglycerine-nitrocellulose used in the composition, lowers the temperature of the combustion products, however, such modification introduces components which cause erosion of the turbine blades and which also produce an undesirable amount of smoke. The perchlorate type solid propellants generate combustion products containing HCl and inorganic salts which introduce serious corrosion and erosion of the turbine blades.

The following objects will be attained by the aspects of this invention.

It is an object of this invention to provide an improved gas generator as a source of heat and power.

It is another object to provide an improved method for starting gas turbine engines.

Another object is the provision of a gas generator for producing a large volume of gas at a high pressure and a relatively low temperature.

Still another object of this invention is the provision of an improved gas generator adapted for the propulsion of vehicles.

It is still another object to provide a solid propellant cartridge capable of giving a relatively short but relatively large burst of power for performing work.

Still another object of this invention is the provision of an improved engine starter which will operate to start an engine at extremely low temperatures where other types of starters will not operate.

Other and further objects and advantages of this invention will be apparent to one skilled in the art upon reading the disclosure of this invention including the accompanying drawing wherein:

Figure 1 is a schematic illustration of the invention as applied to a gas turbine engine, Figure 2 is a sectional view of one form of gas generator of this invention, Figure 3 is a schematic illustration of a torpedo powered by the gas generator of this invention, Figure 4 is a sectional view of one modification of the power generator of the torpedo of Figure 3, Figure 5 shows another modification of the power generator applicable to the torpedo of Figure 3, and Figure 6 is a schematic illustration of the invention applied to starting a reciprocating piston engine.

I have discovered that a solid propellant comprising ammonium nitrate and an organic, polymeric binder, such as a butadiene-methyl vinylpyridine copolymer, can be used in a cartridge to provide a superior source of power where a short burst of power is required to perform a particular operation. This propellant burns at a temperature substantially lower than that of other known propellants. The gases generated are non-toxic, non-corrosive, non-erosive and contain many water soluble compounds such as carbon dioxide, water, and nitrogen oxides. Thus, I have discovered that a gas generator comprising such propellant properly encased in a cartridge provides a superior power source for starting air-borne gas turbine engines, for propelling torpedoes, and starting diesel engines. The low temperature characteristics coupled with the non-corrosive characteristics of the gas generator of my invention provides the ideal power source for starting air-borne gas turbine engines. The water-soluble feature of the combustion gases of my novel gas generator makes possible a simple and practical torpedo which leaves substantially no track.

Broadly speaking, this invention provides an improved gas generator comprising a cartridge containing a solid propellant comprising ammonium nitrate, as the oxidant, and a solid polymeric organic compound, as the fuel or binder thereof. The solid polymeric organic compound preferably comprises a vulcanized or quaternized copolymer of a conjugated diene and a vinyl heterocyclic nitrogen base compound. These propellants are produced by mixing the oxidant and copolymer together with suitable curing agents or quaternizing agents together with or without an appropriate burning rate catalyst. The resulting mixture is then molded and cured to form the solid propellant grain. These propellants and methods for their production are more fully described in copending application Serial No. 284,447, filed April 25, 1952, by W. B. Reynolds and J. E. Pritchard.

A particularly preferred propellant composition is prepared by combining from about 50 to 90 parts by weight of ammonium nitrate, as the solid oxidant, with 10 to 50 parts by weight of binder and burning rate catalyst. The burning rate catalyst will usually comprise 0 to 10 parts by weight of the entire composition. The preferred binder will comprise about 25 to 98 parts by weight of butadiene and about 2 to 75 parts by weight of 2-methyl-5-vinyl-pyridine.

Suitable binder materials also include copolymers of butadiene and styrene, copolymers of butadiene and vinylpyridine, copolymers of butadiene and quinoline, and the like.

Suitable burning rate catalyst include rouge, ammonium dichromate, Prussian blue, Milori blue and the like.

The gas generator of this invention exhibits advantages which make it very desirable for specialized application such as starting gas turbine engines, propelling torpedoes, and in other specialized applications where short but relatively large bursts of power are required. Such applications include certain elevating or freight lifting operations, door opening operations such as locks on canals, starting of large reciprocating engines, pumping propellants in large liquid propellant rockets, and similar applications.

Referring now to the drawing and particularly to Figure 1, gas turbine engine 10 is schematically shown comprised of compressor 11, combustion chamber 12, turbine 13 and exhaust nozzle 14. The starting mechanism comprises an auxiliary turbine 16 connected through reduction gear 17 and disengaging clutch 18 to the rotor assembly of the engine 10 so as to rotate compressor 11 and turbine 13 during the starting operation. The motive fluid for operating the auxiliary turbine 16 comprises combustion gases derived from the burning of the ammonium nitrate and butadiene-methyl vinylpyridine copolymer propellant 19 located in cartridge 20. Cartridge 20 is shown in detail in Figure 2. The gases generated by ignition of the propellant 19 traverses through conduit 21 and auxiliary turbine 16 and are then passed through combustion chamber 12, turbine 13 and exhausted through exhaust nozzle 14. Thus the heat available from the cartridge is advantageously utilized to warm up the combustion chamber prior to combustion of the fuel. Also, the combustion gas may be utilized to heat the fuel supplied to the combustion chamber. Thus, a portion of fuel line 22 is passed in heat exchange relationship with a portion of conduit 21, prior to introduction of fuel into the combustion chamber. Spark means 23 is utilized to ignite the charge of fuel and air in combustion chamber 12.

The propellant 19 is ignited by means of igniter 24 which can be composed, for example of an electric match encased in a capsule of black powder and ignited by an electrical current from a 6 volt battery. A screen 25 prevents solids from being blown into starter turbine 16.

Whereas a single cartridge has been shown, a plurality of cartridges can be provided and arranged so that one or more cartridges can be fired simultaneously for starting. Furthermore, the provision of a plurality of cartridges enables the turbine engine to be started several times before replacing the cartridges becomes necessary. Also the cartridges are illustrated as being located in the nose piece of the power plant, however, it is to be understood that the positioning of the cartridge is not to be limited to this particular location or orientation.

The reduction gear is a conventional gear train and is commercially available as a unit in a number of gear ratios. The disengaging clutch is commercially available such as the starter clutch assembly for automobiles. A magnetic clutch can also be utilized.

The torpedo of Figure 3 is propelled by a turbine driven propeller as shown in detail in Figure 4. Propeller 31 is connected to turbine 32 by shaft 33. Packing gland 34 prevents leakage through bearing 35. Propellant cartridge 20 containing ammonium nitrate/butadiene-methyl vinylpyridine propellant 19 is connected to turbine 32 by conduit 36. Manifold ring 37 is connected to the exhaust side of turbine 32. Discharge tubes 38 exhaust the gases from manifold ring 37 to the exterior of the torpedo. Control line 39 transmits pressure within manifold 37 to conventional control mechanism (not shown) for controlling the course of the torpedo. Ignition of the electric match so as to start combustion of the propellant can advantageously be accomplished by the trip device which arms the torpedo upon leaving the torpedo discharge tube. This operation of arming the torpedo is well known in the art.

Figure 5 shows the gas generator of this invention applied to a torpedo so that the torpedo is propelled directly by exhausting the gases generated rearwardly through a nozzle 41. Prior to igniting propellant cartridge 20, diaphragm 42 seals the end of nozzle 41. Cartridge 20 is secured to the hull of torpedo 30 by support members 43 and 44 so that the discharge end of the cartridge is positioned so as to connect directly with nozzle 41. Control line 45 transmits pressure in nozzle 41 to conventional mechanism (not shown) for controlling the course of the torpedo. Ignition of the electric match can be accomplished by causing the trip, which arms the torpedo, to close an electrical circuit.

Figure 6 shows the gas generator of my invention adapted for starting a diesel engine. Propellant cartridge 20 is connected to turbine 51 so that the gases generated by combustion of propellant 19 flow through conduit 52, turbine 51 and are exhausted by means of conduit 53. Turbine 51 is connected through reduction gearing 54 and disengaging clutch 55 to the hand crank connection 56 of diesel engine 57. Hot exhaust gases from conduit 53 can be directed onto the intake manifold so as to help in heating the engine if desired.

The gas generator of my invention is particularly applicable for starting large reciprocating piston engines in arctic regions where batteries are inoperable.

Some of the advantages of my gas generator are shown in the following table wherein some of the characteristics of the propellant of my gas generator are compared with presently available propellants.

Table

| Property | Properties of Ammonium Nitrate Propellants* | | Reported Properties of Commercially Available Propellants | | Requirements for Gas Turbine Starters |
|---|---|---|---|---|---|
| | 1 | 2 | A | B | |
| Burning Rate @ 1000 p.s.i., $n$, in./sec | 0.159 | 0.170 | 0.29 | 0.31 | 0.15 min. |
| Pressure Exponent | 0.50 | 0.55 | | {0.91, 400 to 820 p.s.i. / 0.34, 820 to 2,000 p.s.i.} | 0.65 max. |
| Temperature Sensitivity Coefficient $\pi K$, percent ° F. | 0.27 | 0.28 | 0.11 to 0.12 | | 0.40 max. |
| Characteristic Exhaust Velocity $C^*$, ft./sec. | {3,771 measured / 3,826 theoretical} | {3,915 measured / 4,010 theoretical} | {3,800 measured / 4,220 theoretical} | | 3,600 min. |
| Density, $\rho$, lb./in.³ | 0.0538 | 0.0545 | 0.056 | | |
| Combustion Temperature, ° F. | 2,010 | 2,320 | 3,005 | 3,090 | 2,800 max. |
| Exhaust Smoke | Smokeless | Smokeless | Smokeless | | Smokeless. |
| Shock Thermal Cycling Without Failure | 4 cycles, −70 to 180° F. after 18 months' aging at 170° F. | 85 cycles −70 to 180° F. | 10 cycles, −65 to 160° F. | Recommended −40 to 140° F. | No failures. |

*See the following table:

|  | Parts by Weight ||
|  | 1 | 2 |
|---|---|---|
| Ammonium nitrate | 80.0 | 82.5 |
| Butadiene-methyl vinylpyridine copolymer binder | 20.0 | 17.5 |
| Catalyst (Milori blue) | 2.0 | 2.0 |

Approximately 1200 ammonium nitrate-butadiene methyl vinylpyridine propellants have been fired in test motors using copper and iron nozzles and there has been no corrosion or erosion of parts noted.

Variations and modifications are possible within the scope of the disclosure of the present invention, the essence of which is the provision of a superior gas generator for providing a large amount of power for a short period of time.

That which is claimed is:

1. An improved gas generator for providing a source of solids-free gas at constantly increasing pressure which consists essentially of a pressure resistant case having an outlet; a screen positioned in said case adjacent said outlet; an axially perforated, internal burning solid propellant comprising a major proportion of ammonium nitrate and a minor proportion of an organic polymeric binder selected from the group consisting of copolymers of butadiene and methyl vinylpyridine, copolymers of butadiene and vinylpyridine, copolymers of butadiene and styrene, and copolymers of butadiene and quinoline contained in said case; means for preventing burning on the exterior surface of said propellant; and means for igniting said propellant within the perforation adjacent the end opposite the outlet.

2. The gas generator of claim 1 wherein the binder is a copolymer of butadiene and vinylpyridine.

3. The gas generator of claim 1 wherein the binder is a copolymer of butadiene and methyl vinylpyridine.

4. An improved gas generating cartridge for producing a constantly increasing volume of solids-free gas at a constantly increasing pressure which consists essentially of a pressure resistant case having a gas exhaust port at one end; an axially perforated, externally restricted propellant grain comprising ammonium nitrate and an organic polymeric binder selected from the group consisting of copolymers of butadiene and methyl vinylpyridine, copolymers of butadiene and vinylpyridine, copolymers of butadiene and styrene, and copolymers of butadiene and quinoline substantially filling said case; a screen positioned between said grain and said port; and means to ignite said grain within the perforation adjacent the end opposite the exhaust port.

5. An improved power unit for producing power in a substantially constantly increasing amount which comprises a cylindrical pressure resistant case having one closed end and a gradually converging end terminating in an exhaust port; an axially perforated grain of a solid, gas-producing material comprising about 50 to about 90 parts by weight of ammonium nitrate, and about 10 to about 50 parts by weight of a copolymer of butadiene and methyl vinylpyridine; a casing substantially enclosing said grain and protecting the external surface of said grain from combustion gases, said encased grain being positioned in said pressure resistant case so as to occupy the cylindrical portion thereof; a screen positioned adjacent said grain between said grain and said port to provide a combustion chamber in the converging section of the case; an electric match encased in a capsule of black powder positioned in the perforation of said grain adjacent the end of the grain opposite the exhaust port; a threaded passageway extending through the closed end of said pressure resistant case and said grain casing to the perforation in said grain; a threaded plug threaded into said threaded passageway; and electric leads connected to said match and extending through said plug for connecting said match to a source of electric energy.

6. In a gas generating cartridge comprising a cylindrical pressure resistant case having a closed end and a gradually converging and terminating in an exhaust port and a screen positioned in said cylindrical case adjacent the converging end terminating in said exhaust port to provide a combustion chamber, the improvement comprising an axially perforated grain for producing solids-free gas and consisting essentially of about 50 to 90 parts by weight of ammonium nitrate and about 10 to about 50 parts by weight of a copolymer of butadiene and methyl vinyl pyridine; a casing substantially enclosing said grain and protecting the external surface of said grain from combustion gases, said grain being positioned in said pressure resistant case so as to occupy the cylindrical portion thereof; an electric match encased in a capsule of black powder positioned in the perforation of said grain adjacent the end of the grain opposite the exhaust port; a threaded passageway extending through the closed end of said pressure resistant case and said grain casing to the perforation in said grain; a threaded plug threaded into said threaded passageway; and electric leads connected to said match and extending through said plug for connecting said match to a source of electrical energy.

References Cited in the file of this patent

UNITED STATES PATENTS

| Re. 13,217 | De Ferranti | Mar. 14, 1911 |
| 1,512,354 | Maxim | Oct. 21, 1924 |
| 1,593,768 | Kasley | July 27, 1926 |
| 1,680,451 | Chandler | Aug. 14, 1928 |
| 1,884,479 | Woolson | Oct. 25, 1932 |
| 2,154,572 | Lansing | Apr. 18, 1939 |
| 2,269,030 | Lysholm | Jan. 6, 1942 |
| 2,335,527 | Murray | Nov. 30, 1943 |
| 2,455,015 | Mace et al. | Nov. 30, 1948 |
| 2,559,006 | Clapham | July 3, 1951 |
| 2,597,641 | Hull et al. | May 20, 1952 |
| 2,605,705 | Millins et al. | Aug. 5, 1952 |
| 2,620,627 | Nardone | Dec. 9, 1952 |
| 2,637,274 | Taylor et al. | May 5, 1953 |
| 2,682,461 | Hutchinson | June 29, 1954 |
| 2,688,920 | Jarvis | Sept. 14, 1954 |
| 2,750,887 | Marcus | June 19, 1956 |

FOREIGN PATENTS

| 655,585 | Great Britain | July 25, 1951 |

UNITED STATES PATENT OFFICE
CERTIFICATE OF CORRECTION

Patent No. 2,985,104  May 23, 1961

Homer M. Fox

It is hereby certified that error appears in the above numbered patent requiring correction and that the said Letters Patent should read as corrected below.

Column 6, line 22, for "and" read -- end --.

Signed and sealed this 6th day of March 1962.

(SEAL)
Attest:

ERNEST W. SWIDER  
Attesting Officer

DAVID L. LADD  
Commissioner of Patents

UNITED STATES PATENT OFFICE
CERTIFICATE OF CORRECTION

Patent No. 2,985,104                                                          May 23, 1961

Homer M. Fox

It is hereby certified that error appears in the above numbered patent requiring correction and that the said Letters Patent should read as corrected below.

Column 6, line 22, for "and" read -- end --.

Signed and sealed this 6th day of March 1962.

(SEAL)
Attest:

ERNEST W. SWIDER                                              DAVID L. LADD
Attesting Officer                                                 Commissioner of Patents